Patented July 28, 1925.

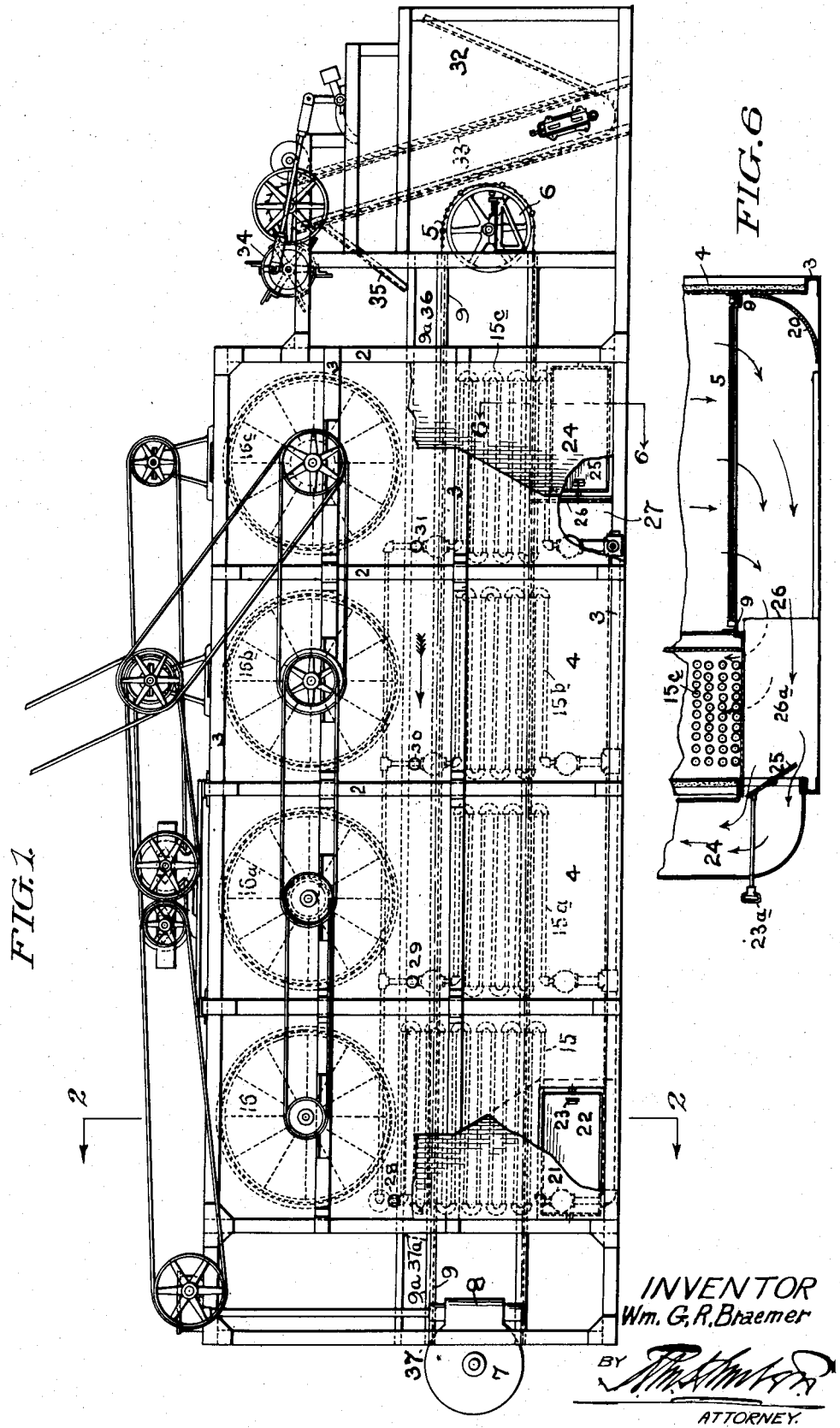

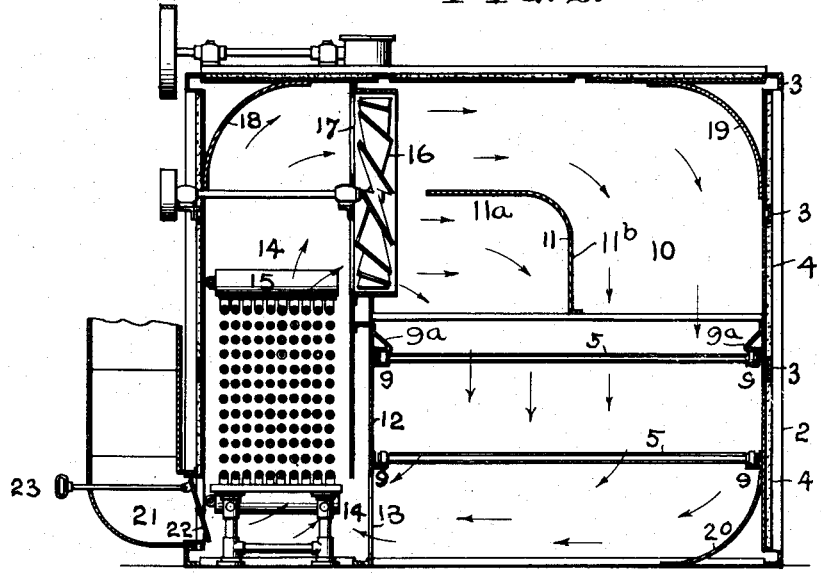
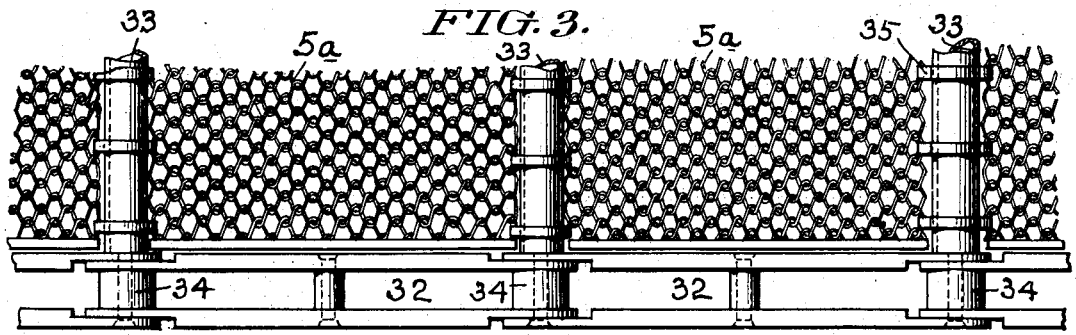
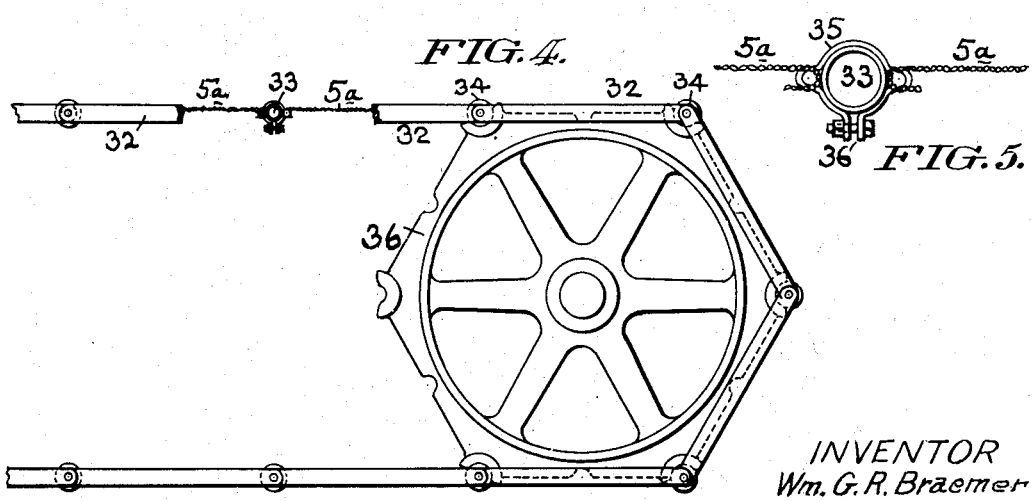

1,547,294

UNITED STATES PATENT OFFICE.

WILLIAM G. R. BRAEMER, OF CRANSTON, RHODE ISLAND, ASSIGNOR TO GENERAL FIRE EXTINGUISHER COMPANY, A CORPORATION OF NEW YORK.

DRYING APPARATUS.

Application filed September 19, 1923. Serial No. 663,531.

*To all whom it may concern:*

Be it known that I, WILLIAM G. R. BRAEMER, a citizen of the United States, and resident of Cranston, county of Providence, and State of Rhode Island, have invented an Improvement in Drying Apparatus, of which the following is a specification.

My invention is specially intended for drying dyed or bleached cotton, cotton linters, cotton and wool mixtures, cotton rags, and any other materials through which air may be circulated while they are being conveyed through the drying apparatus by conveyors of any suitable construction.

My invention comprehends the procedure which includes feeding the materials to be dried through a long drying chamber, heating the air to be employed in the drying process in an adjacent heating compartment, or compartments along the length of the drying chamber, circulating the heated air transversely into the upper portion of the drying chamber above the conveying means for the materials being dried, at intervals along its length by suitable fans or blowers, circulating the air downward through the drying chamber and transversely again into the adjacent heating compartments where it is again heated and from which it is again recirculated, the air being delivered as separate bodies into the drying chamber at definite intervals along its length, but commingled before returning to the heating compartment; and further, admitting fresh air in regulated quantities into the drying chamber adjacent to its discharge and warmest end thereof and discharging substantially equal amounts of moist air from the chamber at or adjacent to its receiving and coolest end, the proportion of the air admitted and discharged being relatively small as compared with the capacity of the respective fans or circulating means, whereby the air content is recirculated many times through the material to be dried during the period of admission and discharge of sufficient air equivalent to the volume of air circulated by one of the fans or blowers in a given time.

My invention also comprehends the employment of means for controlling the amount of the air admitted and air discharged from the drying chamber, for regulating the general speed of travel of the helical current of heated air circulating through the drying and heating chambers in a direction opposite to that of the travel of the materials being dried, whereby the time of treatment with any given body of air may be varied or regulated to suit the character of the goods being treated.

My invention also comprehends the regulation of the heating means for controlling the temperature of the air at different places along the length of the drying chamber, more especially for providing the warmest atmosphere adjacent to the discharge end of the drying chamber and the coolest atmosphere adjacent to the receiving end thereof, said high and low temperatures also preferably corresponding respectively to the places where the fresh air is admitted and the moist air is discharged.

It will now be understood that my object is to provide a character of helical current of heated air, the descending currents passing through the materials being dried and the ascending currents being reheated, the helical condition being induced by the inflow and intermingling of fresh air into one end of the circulation and simultaneous relief or discharge of moist air from the other end of the circulation, whereby the materials are subjected to air currents of any high speed required and the duration of such treatment governed by the relatively slow speed of travel of the helical current longitudinally through the drying chamber under the influence of the small fresh air admission at one end and corresponding discharge of moist air from the other end of the drying chamber or confining space.

As a further feature of my invention, the high speed helical air currents which controllably flow slowly through the length of the drying chamber are caused to change their temperature, said currents adjacent to the discharge end of the drying chamber being most highly heated and as they work their way forward toward the receiving end of the drying chamber they are subjected to heaters of different temperatures, all lower than the initial temperature, until at the place of receiving the moist goods the temperature may be lowest. If we imagine the helical current of air to be stretched out straight, it would then be subject to the heating action of a plurality of different heaters of different temperatures and capable of definite regulation at intervals along its length.

With the above and other objects in view, the nature of which will be more fully understood from the description hereinafter, the invention consists in the novel construction of drying apparatus, as hereinafter more fully described and defined in the claims.

Referring to the drawings: Fig. 1 is a side elevation of a drying apparatus embodying my invention; Fig. 2 is a cross section of the same on line 2—2 of Fig. 1; Fig. 3 is a plan view of a portion of one of the conveyor forms which may be employed; Fig. 4 is a side view of same with one of the sprocket wheels; Fig. 5 is a detail of the conveyor; and Fig. 6 is a cross section taken on line 6—6 of Fig. 1.

The drying chamber and heating compartments may be constructed of wood or wood and metal, but in practice, I prefer to construct the whole apparatus of metal as far as possible. With this object in view, the general frame comprises metal uprights 2 and horizontal metal stringers 3 forming rectangular openings on sides, ends and top which are filled with removable panels 4 of a construction which is more or less heat non-conducting. These panels may readily be removed to provide access to the interior when necessary and also to facilitate the erection of the dryer. I do not confine myself to any particular details of construction for the walls of the structure. The casing thus provided is divided longitudinally by a partition 12 which, near its top, is furnished with a plurality of air passages 17 arranged along the length thereof and having therein fans or blowers 16, 16$^a$, 16$^b$ and 16$^c$. The lower portion of the partition 12 terminates at a distance from the floor to provide a longitudinal lateral opening 13. By this construction, there is provided a long drying chamber 10 and a long heating compartment or chamber 14 communicating at their upper parts at intervals and at their lower parts in a substantially continuous manner.

The heating compartment 14 is provided with a plurality of heaters 15, 15$^a$, 15$^b$ and 15$^c$ of any suitable construction, but preferably corresponding in numbers to the number of fans or blowers 16 and desirably arranged in the same transverse plane. These heaters are provided with separate means 28, 29, 30 and 31 for controlling or regulating their temperatures so that the heater 15 having the control valve 28, may be made to give much greater heat than the remaining individual heaters, and preferably the heater 15$^c$ having control valve 31 is intended to give relatively greatly less temperature for reasons presently to be explained.

The drying chamber 10 is provided with two sets of horizontal guides 9 upon which the endless apron or conveyor 5 travels for carrying the materials to be dried through the chamber. The conveyor 5 is guided about sprocket wheels 6 at the receiving end and about similar sprocket wheels (within the housing 7) at the other or discharge end of the drier. The conveyor passes through a suitable opening at 37$^a$ in the end of the casing wall which may be provided with the usual canvas curtain under which the dried material is discharged and which prevents free inflow or escape of air. The conveyor may be driven by suitable worm and worm-wheel gearing (within the casing 8) in the usual manner. The conveyor extends beyond the drying chamber 10 at one end, as at 36, to receive the materials from the feed chute 35 and at the other end, as at 37, to discharge the material in such manner as to permit its inspection or its collection in any desirable way according to the character of the materials being treated. The parts 36 and 37 provide extensions to the chain guides 9 and have also side guards 9$^a$ to keep the materials on the conveyor and clear of the chains 32 (Fig. 3). The general shape in cross section of these chain guards is shown in Fig. 2.

The materials may be fed to the conveyor 5 in any manner desired and by way of illustration, I have shown the usual type of feeding mechanism. The materials are dumped into a bin 30 and fed upward in uniform quantities by an endless spiked apron 33 from which they are disengaged by a doffer 34 and allowed to fall upon the chute 35 and thereby delivered upon the conveyor at the receiving end of the drying chamber 10.

The interior of the drying chamber has its longitudinal corners made rounded by the curved corner deflector plates 19 and 20; and similarly the longitudinal corners of the heater compartment 14 may have its corners rounded by similar curved deflector plates 18. These curved deflector plates 18, 19 and 20 insure the air currents traveling smoothly and with small resistance thereby requiring less power and avoidance of objectionable churning up of the circulating air. The drying chamber is further preferably furnished with a longitudinal deflector 11 which is desirably made angular with the horizontal part 11$^a$ directed toward the fans 16 and the vertical part 11$^b$ extended downward to a short distance above the upper web of the conveyor 5. This deflector 11 insures a more uniform distribution of the circulating air downward through the conveyor (and contents) throughout its width. It also prevents objectionable eddy or whirling currents in the space above the conveyor. The arrows in Fig. 2 indicate the general flow of the air under the influence of any one of the fans 16. If desired, more than one of these deflector plates 11 may be employed but in such case the relative proportions of the horizontal and vertical parts will be modified to suit.

The conveyor may be of any suitable construction, such as a continuously flexible apron having short link chains at either side with cross rods to which meshed wire cloth may be secured (a well known construction), or it may be formed as shown in Figs. 3, 4 and 5 wherein are employed long link chains 32 having cross rods 33 and rollers 34, to which cross rods are secured wire mesh panels 5ª by looped straps 35 which extend about the rods and through the openings in the panels, the ends of the straps united by bolts as at 36 (Fig. 5).

Provision is made for allowing and definitely assuring of the discharge of moist air from the receiving end of the drying chamber and for receiving fresh air into the drying chamber adjacent to its delivery end in a more or less continuous manner. 24 is an outlet duct from the lower part of the drying chamber 10 at its receiving end and from its side next to the heater compartment, so that the natural circulation of the air within the drying chamber will cause it to gradually find its way out. A damper regulator 25 to control the discharge of air may be hinged in the outlet duct 24 and be adjustable by a rod 23ª (Fig. 6). The inner end of the outlet duct 24 may be extended into the drying chamber by a box-like conduit 26ª having a vertical side wall 26 to separate the moist air passing out from the circulating air passing upward through the space 27 (Fig. 1) to the heater 15ᶜ. The width of the outlet duct 24 and conduit 26ª governs the maximum discharge of moist air, and this may be reduced as desired by adjusting the damper 25.

At the other or delivery end of the drying chamber 10, I provide an intake duct 21 also fitted with an adjustable damper 22, whose position may be adjusted by a rod 23, all as shown in Fig. 2. In this case, the inflow of fresh air may cause it to commingle with the recirculating air as it passes upward to the heater 15, thereby causing the fresh air to be heated before it passes into the drying chamber under the influence of the fan 16. It is desirable that the dampers 22 and 25 be made of the same area but this is not essential as their adjustment is independent and the areas of the effective orifices may be made to correspond with proper adjustment of the dampers where the normal sizes of the intake and discharge openings are not the same.

It will be understood from Figs. 1 and 2 that the length of the drying chamber may be varied by simply extending the machine as a whole, as by introducing more sections, as each section, comprising a fan and a heater, is complete in itself and extend between any two vertical frames 2, 2. In the particular illustration of my improvements, I have shown four sections, but do not restrict myself in this respect. Moreover, while the heater compartments may all open into one another, side by side, this is not at all necessary, as they are in communication at their lower parts where they also communicate with the drying chamber.

More particularly considering the operation of the dryer, it will be understood that the fan 16 circulates the air downward through the drying chamber, thence upward through the heating compartment 14 in contact with heater 15 and repeating the operation a number of times before the said air comes under the influence of the fan 16ª and heater 15ª of the next section; and so on, until the air arrives at the receiving end of the drying chamber and under the influence of the fan 16ᶜ and heater 15ᶜ, the latter being of a materially lower temperature than heater 15. As the transversely circulating air (as indicated in Fig. 2) advances from the delivery end to the receiving end of the drying chamber, the conveyor and materials to be dried thereon are slowly moved through the drying chamber in the opposite direction, so that the materials in their most moist condition are treated with air having the most humid condition and with a relatively low temperature and the excess of moist air thus produced is caused to pass out by the duct 24 (Fig. 6). As the conveyor moves in the direction of the arrow (Fig. 1), the moist materials are next brought into a zone where it is acted upon by currents of air produced by the fan 16ᵇ heated to a somewhat greater temperature by heater 15ᵇ. As the conveyor continues its travel, similar treatments of the materials is brought about as it comes under the influence of the fans 16ª and 16 associated with the heating due to the heaters 15ª and 15 respectively, the temperature preferably gradually increasing. When the treatment is due to the fan 16 and heater 15, the temperature of the air will be the greatest and the materials being treated will be in the driest condition. At this time, however, the fresh air flows into the drying chamber, first passing through duct 21 and heating compartment 14 in contact with the heater 15, under the influence of the fan 16 and the quantity of air admitted is substantially equal to the amount of the moist air discharged. It will further be seen that, in so far as additional volumes of fresh dry air are being drawn into the circulation, the air under the influence of fan 16 will be gradually moved into the zone of circulation of fan 16ª and heater 15ª and so on into the zones of the other fans 16ᵇ and 16ᶜ and their heaters 15ᵇ and 15ᶜ; and it is manifest that this circulation of the air by the several fans gives to it a helical motion as following the course of a spiral coil of wire, the down course being through the drying chamber 10 and materials to be dried and the up course being through the heating compartment. It will also be seen that the air thus circulating in a helical course is subjected to the temperature conditions of the heaters 15, 15ª, 15ᵇ, and 15ᶜ in succession, thereby being gradually cooled as it meets the cooler and more moist materials.

More specifically considered, if we assume that with one cycle of circulation under fan 16 the fresh air received through duct 21 into circulation equals one-twentieth of the volume of the first section, it follows that for the said air of section one (operated on by fan 16) to pass into section two (operated on by fan 16ª) the air would have passed through the materials to be dried twenty times. This same action will take place in respect to each of the sections, and assuming further, that the materials pass in the opposite direction with an equal speed, it follows that the material will have been subjected to twenty-times four or eighty passages of the whole of the drying medium through it while passing approximatey a distance of twenty-four feet through the drying chamber. It will also be understood that by increasing the speed of the fans the transverse circulation may be made more rapid and under these conditions the intake of the fresh air may be relatively less, so that instead of a speed equalling eighty passages of the full volume of the drying medium through the materials, 100 or more passages may be given with the same volume of air. In fact, by properly controlling the speed of the conveyor, the speed or pitch of the fans or blowers and the intake of fresh air, the speed of circulation through the materials may be made greater or less, as desired.

As the different sections corresponding to the several fans have independent heaters, it is evident that the temperatures employed at different places along the length of the drying chamber may be adjusted to the requirements. For example, the heater 15 may be adjusted to give the greatest temperature, heater 15ª may suffice with a relatively low temperature, heater 15ᵇ may give a temperature greater than heater 15ª but less than heater 15, and heater 15ᶜ may give a temperature less than heater 15ᵇ, with good results, as the recirculations or speed of circulation permits of great latitude in adjusting the temperature conditions. These temperature conditions would be varied to suit different materials being dried, as in some the last traces of moisture are far more difficult of removal than in others.

It will be also understood that as the fans or blowers are forcing the air into the drying chamber 10 above the conveyor and through a resistance provided by the materials being treated, and are exhausting the air from below said conveyor, there will be an excess of pressure within the chamber above the conveyor, and hence a condition to facilitate the circulation of the air through the materials. This differential in pressure may be modified as conditions require, it increasing with a more forced circulation as when increasing the speed thereof, as above expained.

The construction of my improved dryer provides capacity for adjustment as to temperatures, speed of circulation, time of treatment, humidity conditions of the drying medium and pressure conditions, whereby it may be adapted to suit practically any and all conditions met with in commercial practice.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim and desire to secure by Letters Patent is:

1. In a drying machine, the combination of a long casing providing a drying chamber having conveyor guides within and along its length and an outlet opening at one end for delivery of the material being dried, an endless conveyor of suitable construction arranged along the length of the casing and supported upon the guides and operating to convey the materials to be dried through the drying chamber and discharging it in dried condition from the outlet opening, a heating chambered structure arranged along one side of the drier casing and having a plurality of air passages arranged respectively at intervals from its upper part and opening into the upper portion of the drying chamber above the conveyor and further having lateral openings from its lower part into the lower portion of the drying chamber below the conveyor, a plurality of circulating fans respectively arranged in the air passages for forcing air from the heating chamber into the upper part of the drying chamber, a plurality of separate heaters arranged along the length of the drier casing and positioned within the heating chambered structure for heating the air circulated by the fans, and separate controlling means for the several heaters whereby different degrees of heat may be given to the air circulated transversely by the respective fans at different places along the length of the drying chamber.

2. The invention according to claim 1, wherein further, the heating capacity of the heaters adjacent to the discharge end of the casing and conveyor are greater than that of the other heaters between the discharge end and the receiving end of the drier casing.

3. The invention according to claim 1, wherein further, the drier casing is provided adjacent to its receiving and its discharge ends respectively with outlet and inlet air passages for escape of moist air and supply of fresh dry air, and adjustable controlling dampers for said air passages to control and regulate the rate of change of air during the drying operation.

4. The invention according to claim 1, wherein further, the drier casing is provided adjacent to its receiving and its discharge ends respectively with outlet and inlet air passages for escape of moist air and supply of fresh dry air, and adjustable controlling dampers for said air passages to control and regulate the rate of change of air during the drying operation, and wherein the air inlet passage opens into the bottom of the heating chamber below the heaters and the air outlet passage opens into the bottom of the drier chamber below the conveyor.

5. The invention according to claim 1, wherein further, the drier casing is provided adjacent to its receiving and its discharge ends respectively with outlet and inlet passages for escape of moist air and supply of fresh dry air, and adjustable controlling dampers for said air passages to control and regulate the rate of change of air during the drying operation, and in which the air inlet passage opens into the bottom of the heating chamber below the heaters and the air outlet passage opens into the bottom of the heating chamber below the conveyor, and the said outlet passage is provided with a side wall to insure the discharged moist air coming from the drying chamber at its end most distant from the discharge end.

6. The invention according to claim 1, wherein further the drier casing along its length is provided with a longitudinal deflector plate having a general angular shape in cross section, one edge of which is directed horizontally toward the axes of the fans and the other edge is directed downward and centrally toward the conveyor, the said deflector receiving the horizontal air currents from the fans and deflecting it downward along the length of the conveyor.

7. The invention according to claim 1, wherein further the heating chambered structure comprises a continuous longitudinal side chamber having its lower openings into the lower part of the drying chamber made substantially continuous so that the air delivered separately by the fans into the drying chamber is delivered therefrom to the heaters in a more or less commingled condition and forming an approximation of a helical current from the delivery end to the receiving end of the drying chamber.

8. The invention according to claim 1, wherein further, the heating chambered structure comprises a continuous longitudinal side chamber having its lower openings into the lower part of the drying chamber made substantially continuous so that the air delivered separately by the fans into the drying chamber is delivered therefrom to the heaters in a more or less commingled condition and forming an approximation of a helical current from the delivery end to the receiving end of the drying chamber, and in which there are also provided, as many independent sets of heaters as there are fans, each heater being located below one of the fans and the heaters being graded as to capacity whereby the greatest heat is provided to the air circulated by the fan nearest to the discharge opening from the drying chamber for the conveyor and materials being treated and the least heat is provided to the moist air circulated by the fan adjacent to the receiving end of the conveyor and drying chamber.

9. The invention according to claim 1, wherein further the drying chamber above the conveyor is provided with distributing deflector means for insuring a distribution of the heated air passing from the fans to the more distant portions of the conveyor.

10. The invention according to claim 1, wherein further the heating chambered structure comprises a continuous longitudinal side chamber having its lower openings into the lower part of the drying chamber made substantially continuous so that the air delivered separately by the fans into the drying chamber is delivered therefrom to the heaters in a more or less commingled condition and forming an approximation of a helical current from the delivery end to the receiving end of the drying chamber, and in which there are also provided, means for permitting a regulated discharge of moist air from the drying chamber at its coolest end and for receiving a substantially equal amount of fresh air at its warmest end, the proportion of air admitted and discharged being relatively small as compared with the capacity of the respective fans, whereby the air content is recirculated many times through the material supported on the conveyor during the period of admission or discharge of sufficient air equivalent to the volume of air circulated by one of the fans in a given time.

11. The invention according to claim 1, wherein further, the heating chambered structure comprises a continuous longitudinal side chamber having its lower openings into the lower part of the drying chamber made substantially continuous so that the air delivered separately by the fans into the drying chamber is delivered therefrom to the heaters in a more or less commingled condition and forming an approximation of a helical current from the delivery end to the receiving end of the drying chamber, and in which there are also provided means for permitting a regulated discharge of moist air from the drying chamber at its coolest end and for receiving a substantially equal amount of fresh air at its warmest end, the proportion of air admitted and discharged being relatively small as compared with the capacity of the respective fans, whereby the air content is recirculated many times through the material supported on the conveyor during the period of admission or discharge of sufficient air equivalent to the volume of air circulated by one of the fans in a given time, and in which also controlling means are provided for regulating the quantity of air admitted and discharged proportionately to the air handling capacity of the respective fans, whereby the longitudinal travel of the body of air within the drying chamber from the discharge end to the receiving end during the helical recirculation may be controlled and the air medium may be kept in contact with the material many times longer than would occur if the admission of fresh air were equal to the capacity of the respective fans.

12. In a drying machine, the combination of a long casing providing a drying chamber having conveyor guides along its length and an outlet opening for delivery of the material being dried, an endless conveyor of suitable construction arranged along the length of the casing and supported upon the guides and operating to convey the materials to be dried through the drying chamber and discharging it in dried condition from the outlet opening, a heating chambered structure arranged along one side of the drier casing and having a plurality of air passages arranged respectively at intervals from its upper part and opening into the upper portion of the drying chamber above the conveyor and further having lateral openings from its lower part into the lower portion of the drying chamber below the conveyor, a plurality of circulating fans respectively arranged in the air passages for forcing air from the heating chamber into the upper part of the drying chamber, heating means arranged in the heating chambered structure adjacent to each of the fans for heating the air circulated by them, means to control the temperature and maintain a higher temperature within the drying chamber adjacent to its discharge end than at its receiving end, and means for permitting discharge of moist air from the drying chamber at its coolest end and for receiving a substantially equal amount of fresh air at its warmest end, the proportion of air admitted and discharged being relatively small as compared with the capacity of the respective fans, whereby the air content is recirculated many times through the material supported on the conveyor during the period of admission or discharge of sufficient air equivalent to the volume of air circulated by one of the fans in a given time.

13. The invention according to claim 12, wherein further controlling means are provided for regulating the quantity of air admitted and discharged proportionately to the air handling capacity of the respective fans, whereby the longitudinal travel of the body of air within the drying chamber from the discharge end to the receiving end during the helical recirculation may be controlled and the air medium may be kept in contact with the material many times longer than would occur if the admission of fresh air were equal to the capacity of the respective fans.

14. A drying apparatus comprising a drying chamber, means to heat air and circulate it through the chamber, and an endless conveyor for conveying the material to be dried through the chamber consisting of long chain links forming two side chains, transverse connecting rods joining the chains at intervals along their length, panels of open work arranged between the chains and the connecting rods, and means of attachment consisting of straps looped through adjacent ends of the panels and around the rods and uniting means for the ends of the straps.

In testimony of which invention, I hereunto set my hand.

WILLIAM G. R. BRAEMER.